May 12, 1959     D. K. GIBSON     2,886,766
FREQUENCY STABILIZATION SYSTEM
Filed Dec. 7, 1956
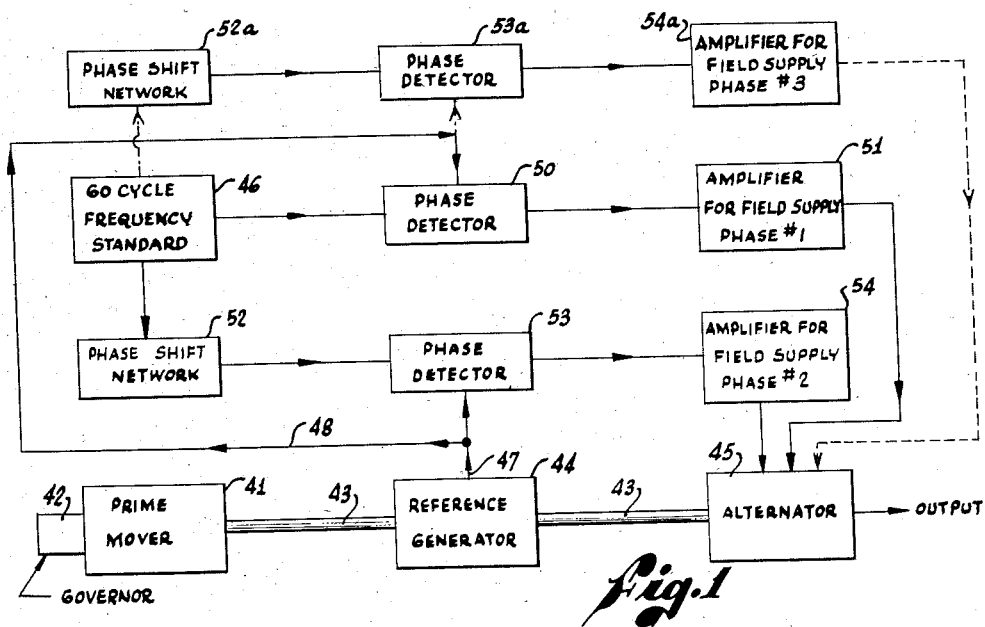
Fig.1
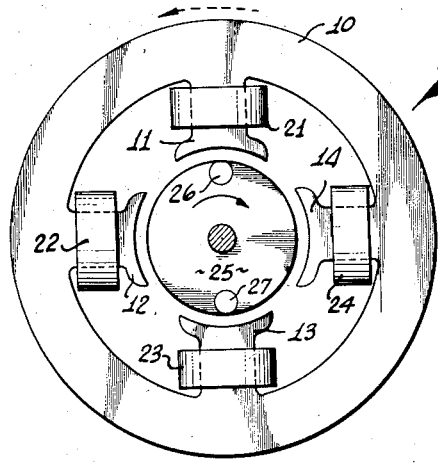
Fig.2
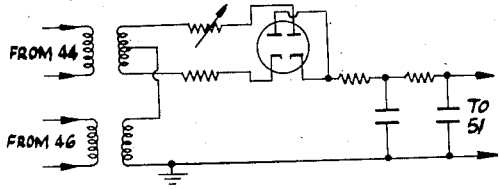
Fig.4
Fig.3
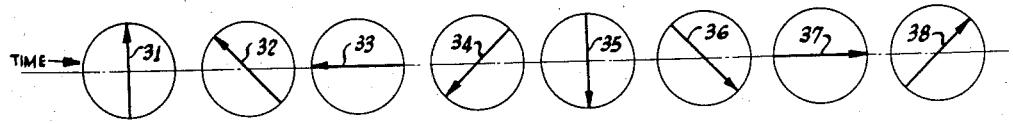
INVENTOR.
DANIEL K. GIBSON
BY
Attorneys United States Patent Office 2,886,766
Patented May 12, 1959

2,886,766

FREQUENCY STABILIZATION SYSTEM

Daniel K. Gibson, Spring Valley, Calif., assignor to The Regents of the University of California, Berkeley, Calif., a corporation of California Application December 7, 1956, Serial No. 626,875

8 Claims. (Cl. 322—31)

This invention relates generally to a frequency stabilization system, and more particularly to such a system intended to stablize the frequency of the power produced by an alternator or rotating alternating current generator.

In many instances, for example, on board a ship, an isolated alternating current generating plant or system is provided whose output frequency must be maintained within rather precise limits, even through the speed of the prime mover may be subject to variations. The frequency stability is often of critical importance, as many different items of scientific equipment require a power source whose frequency is maintained within very narrow limits, since the frequency acts as a means of measuring or determining time or intervals thereof.

On the other hand, a conventional alternator must be driven at a carefully regulated constant speed in order to provide power having the desired stabilized frequency, and in addition to requiring that the speed of the prime mover remain constant under a uniform load, this same speed must be maintained at all times and under all loads. Governors are available that materially assist in maintaining the speed of a prime mover substantially constant, but when a relatively large load is suddenly applied or removed, it is difficult, if not impossible, for the governor to maintain constant the speed of the alternator.

Vacuum tube oscillators having a stabilized frequency are available, but these quickly become rather complicated and expensive, and can provide, in any normal size, only limited amounts of power. However, such devices have been used in the past to provide the more accurate timing frequency, while the regular power supply has been used to provide non-critical incidental power. This, of course, requires re-working of many of the items of equipment, and introduces many complications.

It is possible to secure a frequency stabilized output by using auxiliary rotary equipment, but this leads to additional expense, complications, and weight, requires extra space, and is not satisfactory.

It has been found that it is possible to provide an alternator of slightly modified construction that is driven by the normal speed-regulated prime mover, and with suitable control equipment, provide a frequency stabilized output of any reasonable magnitude, with few complications, and a minimum of expense.

It is therefore a major object of this invention to provide improved frequency stabilization for alternating current generators.

Another object of the invention is to provide such an alternator and the controls therefor that provide the stabilized output directly, and not through the use of auxiliary stabilization equipment, including rotating machinery, etc.

It is a further object of the invention to provide such an alternator and control that is capable of developing reasonably large amounts of power, well in excess of the practical amounts developed by most vacuum tube systems.

Still another object of the invention is to provide a system of great simplicity, requiring a minimum of maintenance and servicing.

It is still a further object of the invention to provide such an alternator and control therefor having a constant frequency output whose accuracy is determined by the accuracy of the frequency standard, and may easily be made comparable to that provided by large public utilities.

These and other objects and advantages of the invention will become apparent from the following description of a preferred form thereof, and from the drawings illustrating that form in which:

Figure 1 is a block diagram of the complete system;
Figure 2 is a somewhat schematic diagram illustrating the theory of operation of the improved alternator and system;
Figure 3 is a diagram illustrating the rotation of the magnetic field; and
Figure 4 is a schematic diagram of one form of a phase detector, as used in this invention.

In the generation of electric power, a conductor is moved across a magnetic field, thereby causing a voltage to be induced in the conductor. Generally, the conductor is formed as a loop or coil that is rotated about an axis perpendicular to the lines of magnetic flux of the field. In such an arrangement, the voltage induced in the two sides of the loop is such that they tend to cause current to flow from one conductor, through the other conductor, through an external load, and back to the first conductor, the voltages aiding each other, all as is well-known. If the voltage of the single loop just mentioned is measured, it will be found that the polarity will reverse twice each revolution, and the voltage, plotted against angular displacement, will have a wave form approximating that of a sine wave.

Whether the magnetic field is held stationary and the conductor is moved across the field, as is common in direct current generators and in many smaller alternating current generators, or whether the conductors are held stationary and the magnetic field is moved, as is the case in many larger alternators, the same general results are obtained, since it is the relative movement of the conductor with respect to the field that causes the generation of the electric power. Likewise, any combination of movement of the conductor and of the field will produce similar results, so long as the relative movement between the conductor and the field remains constant.

In Figure 2 there is indicated a very simplified form of a generator having a frame member 10 on which are mounted a number of pole pieces 11, 12, 13, and 14. The pole pieces 11, 12, 13, and 14 are each provided with separate energizing coils or windings 21, 22, 23 and 24, respectively, and the pole pieces are placed immediately adjacent a rotating member or armature 25 carrying a pair of conductors 26 and 27. When the pole pieces 11, 12, 13, and 14, are properly energized, the conductors 26 and 27 cut across the magnetic field formed by the pole pieces, and a voltage is induced in the conductors, all as is well-known.

In this simplified version, the pole pieces 11 and 13 are placed diametrically opposite each other, and the pole pieces 12 and 14, likewise diametrically opposite each other, are centered on a line perpendicular to the center line of the pole pieces 11 and 13. Thus, pole pieces 12 and 14 are in space quadrature with pole pieces 11 and 13. If the windings 21 and 23 are now energized so that pole piece 11 becomes a south pole and pole piece 13 becomes a north pole, while windings 22 and 24 are not energized and the pole pieces 12 and 14 do not contribute to the magnetic field, the resulting magnetic flux will have a direction which may be considered as passing from pole piece 13, through the armature 25, to the pole piece 11, indicated by the vertical vector 31 in Figure 3. Thereafter, if the pole pieces 11 and 12 are both energized by their respective coils 21 and 22 so that both pole pieces are south poles, and pole pieces 13 and 14 are correspondingly energized so that they are north poles, the resulting magnetic field is shifted, and, assuming that the pair of pole pieces 11 and 13 have the same magnetic effect as the pair of pole pieces 12 and 14, the resulting magnetic field is rotated 45 degrees from the first field, as indicated by the diagonal vector 32 in Figure 3.

When the pole pieces 12 and 14 alone are energized so that pole piece 12 is a south pole, and pole piece 14 is a north pole, the resulting magnetic field is indicated by the horizontal vector 33 of Figure 3. By continuing the shifting of the energization of the various pole pieces, the resulting magnetic field can, in well-known manner, be caused to shift so that it next is in the diagonal direction indicated by the vector 34, then the vertical direction indicated by the vector 35, and continuing in the same manner, in the directions of the vectors 36, 37, and 38. In this way, the magnetic field passing through the armature 25 may be rotated without any mechanical rotation of the frame 10. It will be appreciated that this mode of operation is well-known in the electrical art.

Applying these facts to the instant problem, and remembering that it is the relative speed of the magnetic field and of the conductors that is of prime importance, and not the absolute speed of the armature 25, it can be seen that if the armature is rotated at a substantially constant speed, it is possible to compensate for variations in that speed by rotating the magnetic field by changing the energization of the pole pieces 11, 12, 13, and 14.

The complete frequency stabilizing system is shown in block diagram form in Figure 1. As shown in that diagram, a prime mover 41, which may be a turbine, an internal combustion engine, or any other suitable source of power whose speed is controlled and regulated by a governor 42, has an output shaft 43 that drives a reference generator 44, hereinafter described, and an alternator 45 that may be comparable to the simplified alternator shown in Figure 2. The output of the alternator 45 is electrical energy, and by the presently described invention, this energy is in the form of alternating current having a stabilized frequency.

To detect variations in the speed of the prime mover 41, a frequency standard is provided that may take the form of a tuning fork, a crystal controlled oscillator, or any other suitable form of constant frequency device. In the present instance, the frequency standard 46 is indicated as having a 60 cycle per second frequency, but clearly other frequencies can be used if so desired.

Driven by the output shaft 43 of the prime mover 41 is a reference generator 44 of relatively low capacity, and adapted to provide a 60 cycle signal when the prime mover 41 is operating at the desired speed. As the prime mover 41 has its speed reduced, the signal produced by the reference generator 44 will have its frequency reduced a corresponding amount, and similarly as the speed of the prime mover is increased, the frequency of the signal produced by the reference generator will likewise increase. Small generators of the type used for the reference generator 44 are well-known, and in some of the simpler forms consist essentially of a permanent magnet rotor revolving within a stationary member or stator having windings in which a voltage or signal is induced by the rotation of the rotor.

The signal from the reference generator 44 is carried by conductors 47 and 48 to one input of a phase detector 50, whose other input is connected to the frequency standard 46. The function of the phase detector is to compare the frequency of the signal developed by the reference generator 44 with the standard frequency developed by the frequency standard 46, and to provide an output signal which has an instantaneous voltage proportional to the phase difference between the two voltages, and alternating at a frequency equal to the frequency difference between the two voltages. The signals from the reference generator 44 and from the frequency standard 46 are adjusted so that both have the same amplitude, and consequently if the signal from the reference generator 44 is in phase and in synchronism with the signal from the frequency standard 46, the output of the phase detector 50 will be a signal having a zero voltage and a zero frequency. If the signal from the reference generator 44 has a frequency of 59 cycles per second, while the frequency standard maintains a 60 cycle per second signal, the output from the phase detector 50 will be a signal having a frequency of 1 cycle per second.

The phase detector 50 may take many well-known forms, and one suitable and very simple form is illustrated in Figure 4.

In addition to the application of the output of the frequency standard 46 to the phase detector 50, a portion of the frequency standard output is applied to a phase shifting network 52 which shifts the phase of the standard frequency signal, which, in the present example, amounts to a 90 degree phase shift. The output from the phase shift network 52 is then applied to another phase detector 53, similar to the phase detector 50, and likewise connected to the output of reference generator 44. Again, the output of the phase detector 53 is a signal whose instantaneous voltage is proportional to the phase difference between the two input signals, and alternating at a frequency equal to the frequency difference between the two input signals. As before, the output of the phase detector 53 is applied to an amplifier 54 having sufficient power to properly energize the field of the alternator 45.

The amplifiers 51 and 54 will, in general, have power outputs appropriate for the alternator 45 which they control. Thus, the amplifier for a relatively small generator may consist essentially of a vacuum tube amplifier adapted to deliver the necessary amount of power. For larger alternators, the vacuum tube amplifier may be replaced by a rotating amplifier of the type available under the trade names of "Amplidyne," "Regulex," etc. Alternatively, magnetic amplifiers may be used where relatively large amounts of power are to be controlled.

As previously indicated, the output of the amplifiers 51 and 54 are applied to the field winding of the alternator 45. Thus, amplifier 51 may have its output connected to the coils 21 and 23, corresponding to phase 1 of the alternators, these coils controlling the magnetic energization of the pole pieces 11 and 13, respectively. Likewise, the output of amplifier 54 may be connected to the coils 22 and 24, corresponding to phase 2 of the alternator, and these coils correspondingly controlling the energization of pole pieces 12 and 14. It will be realized that when the prime mover 41 is rotating at the desired speed, the reference generator 44 will supply a signal that is in synchronism, though not necessarily in phase, with the signal from the frequency standard 46. Under these conditions, and assuming that the reference generator 44 provides a signal that is 90 degrees out of phase with the signal from the frequency standard 46, the phase detector 50 will provide an output signal that is a direct current, or expressed differently, an alternating current having zero frequency, since there is zero frequency difference between the reference generator signal and the frequency standard signal. At the same time, the output from the second phase detector 53 will be a signal of zero frequency and, since there is no phase difference between the two input signals to the second phase detector, having a zero voltage magnitude. Consequently, amplifier 51 will provide the energization for field windings 21 and 23, and amplifier 54 will not provide any energization for field coils 22 and 24. The magnetic field within the alternator 45 may then be considered to be in the direction of the vector 31 in Figure 3.

If the prime mover 41 then has its speed decreased slightly, the phase detector 50 will provide an alternating current having the characteristics previously mentioned, and the phase detector 53 will act similarly, but the outputs of the phase detectors 50 and 53 will be 90 degrees out of phase. Consequently, the field developed by the coils 21 and 23 will be in time quadrature with the field developed by the windings 22 and 24. Under these conditions of time and space quadrature, a rotating field is produced that rotates within the alternator 45 in a direction counter to the direction of rotation of the armature 25, when the speed of the prime mover 41 has dropped below normal. Should the prime mover have its speed increased above normal, the rotating magnetic field will rotate in the opposite direction so that the relative speed between the armature 25 and the magnetic field remains a constant at all times.

In practice, instead of the alternator 45 being constructed with separate pole pieces 11, 12, 13, and 14, known as salient poles, it has been found better to use a form of construction in which windings corresponding to the windings 21, 22, 23, and 24, are placed in slots in the interior of the frame 10, in a form of construction well-known in the art and identified as a distributed field winding. In either case, the electrical and magnetic inertia of the magnetic field and the windings producing it requires that the amplifiers 51 and 54 must be capable of delivering appreciable amounts of power, and consequently the less that the magnetic field must be shifted or rotated, the more efficient the system is. This indicates that it is very desirable to make use of as efficient a governor 42 for the prime mover 41 as is practical, thereby reducing the variations in speeds of the output shaft 43, and consequently reducing the work of the amplifiers 51 and 54.

The system heretofore described and illustrated has made use of a two phase field, since it is a more simple form to explain. However, a three phase system can easily be made using the fundamental teachings of the present system, and providing an additional phase detector and amplifier, as well as two 120 degree phase shifting network, instead of a single 90 degree phase shifting network. Under these conditions, the phase shifting network 52 is replaced with a network that shifts the phase 120 degrees, and a similar phase shifting network 52a, phase detector 53a, and amplifier 54a, with the phase shifting network shifting the phase 120 degrees in the opposite direction, is employed to energize the third phase of the alternator 45. The armature 25 may be wound to provide 1, 2, or 3 phase output, as is well-known in the art, and the advantage to be gained in using the three phase field winding instead of a 2 phase is found in certain advantages in construction and design.

While the phase shifting network 52 has been shown as being connected in series between the frequency standard 46 and the phase detector 53, comparable results may be achieved by placing it in series with the connection from the reference generator 44, making appropriate allowance for the new phase relationship. This form of construction may be of particular value in the three phase form of control.

One of the requirements of an alternator of the type described is that it must contain more iron in its magnetic circuit because that circuit must be operated in a linear portion of the magnetization curve, always well below saturation. Additionally, there is a voltage regulation problem caused by armature reaction which appears to be exaggerated when the generator departs a fair amount from synchronous speeds, but this can be minimized through the use of feed-back and compensating windings.

From the foregoing, it will be appreciated that there has been described an alternator and a frequency stabilizing system therefor that is fully capable of achieving the objects and securing the advantages heretofore set forth. While a preferred form of invention has been described, it is to be understood that it is not to be limited to the particular form of arrangement of parts herein described and shown, except as limited by the following claims.

I claim:

1. A frequency stabilization system of the class described which includes: a prime mover having a governor acting to maintain the speed of said prime mover substantially at a predetermined value; an alternator driven by said prime mover and having an armature and field windings; a reference generator driven by said prime mover and providing an output signal whose frequency is proportional to the speed of said prime mover; a frequency standard providing a constant frequency output signal; comparison means connected to the outputs of said reference generator and said frequency standard and comparing the output signals thereof to provide a control signal; and means adapted to energize said field windings in accordance with said control signal, whereby the magnetic field produced by said field windings is caused to rotate with respect to said armature to compensate for deviations in the speed of said prime mover.

2. A frequency stabilization system of the class described which includes: a prime mover having a governor acting to maintain the speed of said prime mover substantially at a predetermined value; an alternator driven by said prime mover and having an armature and field windings; a reference generator driven by said prime mover and providing an output signal whose frequency is proportional to the speed of said prime mover; a frequency standard providing a constant frequency output signal; comparison means connected to the outputs of said reference generator and said frequency standard and comparing the output signals thereof to provide a control signal; amplifier means connected to said comparison means and effective to amplify said control signal; and means connecting said amplifier means to said field windings to control the energization of the latter, whereby the magnetic field produced by said field windings is caused to rotate with respect to said armature to compensate for deviation in the speed of said prime mover.

3. A frequency stabilization system of the class described which includes: a prime mover having a governor acting to maintain the speed of said prime mover substantially at a predetermined value; an alternator driven by said prime mover and having an armature and field windings; a reference generator driven by said prime mover and providing an output signal whose frequency is proportional to the speed of said prime mover; a frequency standard providing a constant frequency output signal; a first comparison means connected to the outputs of said reference generator and said frequency standard and comparing the output signals thereof to provide a first control signal; phase shifting means connected to the output of said frequency standard and providing an output signal whose phase is displaced a predetermined amount from the phase of said frequency standard; a second comparison means connected to the outputs of said reference generator and said phase shifting means and comparing the output signals thereof to provide a second control signal; amplifier means connected to said first and second comparison means and separately amplifying said first and second control signals; and means connecting said amplifier means to said field windings so that said first control signal controls the energization of one of said field windings and said second control signal controls the energization of another of said field windings, whereby the magnetic field produced by said field windings is caused to rotate with respect to said armature to compensate for deviations in the speed of said prime mover.

4. A frequency stabilization system of the class described which includes: a prime mover having a governor acting to maintain the speed of said prime mover substantially at a predetermined value; an alternator driven by said prime mover and having an armature and field windings; a reference generator driven by said prime mover and providing an output signal whose frequency is proportional to the speed of said prime mover, said frequency being substantially equal to the desired frequency of said system; a frequency standard providing an accurate constant frequency output signal that is the desired frequency of said system; comparison means connected to the outputs of said reference generator and said frequency standard and comparing the output signals thereof to provide a control signal; amplifier means connected to said comparison means and effective to amplify said control signal; and means connecting said amplifier means to said field windings to control the energization of the latter, whereby the magnetic field produced by said field windings is caused to rotate with respect to said armature to compensate for deviation in the speed of said prime mover.

5. A frequency stabilization system of the class described which includes: a prime mover having a governor acting to maintain the speed of said prime mover substantially at a predetermined value; an alternator driven by said prime mover and having a rotating armature and stationary field windings, said field windings being arranged to provide a plurality of separate phase windings; a reference generator driven by said prime mover and providing an output signal whose frequency is proportional to the speed of said prime mover, said frequency being substantially equal to the desired frequency of said system; a frequency standard providing an accurate constant frequency output signal that is the desired frequency of said system; a first comparison means connected to the outputs of said reference generator and said frequency standard and comparing the output signals thereof to provide a first control signal; phase shifting means connected to the output of said frequency standard and providing an output signal whose phase is displaced a predetermined amount from the phase of said frequency standard; a second comparison means connected to the outputs of said reference generator and said phase shifting means and comparing the output signals thereof to provide a second control signal; amplifier means connected to said first and second comparison means and separately amplifying said first and second control signals; and means connecting said amplifier means to said field windings in such a manner that said first control signal controls the energization of one phase winding of said field windings, and said second control signal controls the energization of another phase winding of said field windings, whereby the magnetic field produced by said field windings is caused to rotate with respect to said armature to compensate for deviations in the speed of said prime mover, thereby accurately maintaining the output of said alternator at said desired frequency.

6. A frequency stabilization system of the class described which includes: a prime mover having a governor acting to maintain the speed of said prime mover substantially at a predetermined value; an alternator driven by said prime mover and having a rotating armature and stationary field windings, said field windings being arranged to provide a plurality of separate phase windings; a reference generator driven by said prime mover and providing an output signal whose frequency is proportional to the speed of said prime mover, said frequency being substantially equal to the desired frequency of said system; a frequency standard providing an accurate constant frequency output signal that is the desired frequency of said system; a first comparison means connected to the outputs of said reference generator and said frequency standard and comparing the output signals thereof to provide a first control signal whose instantaneous voltage is proportional to the phase difference, and whose frequency is equal to the difference in frequency, between said signals from said reference generator and said frequency standard; a second comparison means whose input circuits are connected to the outputs of said reference generator and said frequency standard, said second comparison means having phase shifting means connected in one of its input circuits to introduce a predetermined phase shift between the output signals from said frequency standard and said reference generator, said second comparison means providing a second control signal whose instantaneous voltage is proportional to the phase difference, and whose frequency is equal to the difference in frequency, between the phase-shifted input signal and the other input signal; a first amplifier means connected to said first comparison means and amplifying said first control signal; a second amplifier means connected to said second comparison means and amplifying said second control signal; means connecting the output of said first amplifier means to one of said phase windings of said alternator to control the energization thereof; and means connecting the output of said second amplifier means to another of said phase windings of said alternator to control the energization thereof, whereby the magnetic field produced by said field windings is caused to rotate with respect to said armature to compensate for deviations in the speed of said prime mover, thereby accurately maintaining the output of said alternator at said desired frequency.

7. A frequency stabilization system of the class described which includes: a prime mover having a governor acting to maintain the speed of said prime mover substantially at a predetermined value; an alternator driven by said prime mover and having an armature and field windings, said field windings including two separate phase windings in space quadrature; a reference generator driven by said prime mover and providing an output signal whose frequency is proportional to the speed of said prime mover, said frequency being substantially equal to the desired frequency of said system; a frequency standard providing an accurate constant frequency output signal that is the desired frequency of said system; a first comparison means connected to the outputs of said reference generator and said frequency standard and comparing the output signals thereof to provide a first control signal whose instantaneous voltage is proportional to the phase difference, and whose frequency is equal to the difference in frequency, between said signals from said reference generator and said frequency standard; a second comparison means whose input circuits are connected to the outputs of said reference generator and said frequency standard, said second comparison means having phase shifting means connected in one of its input circuits to introduce a 90 degree phase shift between the output signals from said frequency standard and said reference generator, said second comparison means providing a second control signal whose instantaneous voltage is proportional to the phase difference, and whose frequency is equal to the difference in frequency, between the phase-shifted input signal and the other input signal; a first amplifier means connected to said first comparison means and amplifying said first control signal; a second amplifier means connected to said second comparison means and amplifying said second control signal; means connecting the output of said first amplifier means to a first of said phase windings of said alternator to control the energization thereof; and means connecting the output of said second amplifier means to the phase winding of said alternator which is in space quadrature with said first of said phase windings to control the energization thereof, whereby the magnetic field produced by said field windings is caused to rotate with respect to said armature to compensate for deviations in the speed of said prime mover, thereby accurately maintaining the output of said alternator at said desired frequency.

8. A frequency stabilization system of the class described which includes: a prime mover having a governor acting to maintain the speed of said prime mover substantially at a predetermined value; an alternator driven by said prime mover and having an armature and field windings, said field winding including three separate phase windings arranged in three-phase relationship; a reference generator driven by said prime mover and providing an output signal whose frequency is proportional to the speed of said prime mover, said frequency being substantially equal to the desired frequency of said system; a frequency standard providing an accurate constant frequency output signal that is the desired frequency of said system; a first comparison means connected to the outputs of said reference generator and said frequency standard and comparing the output signals thereof to provide a first control signal whose instantaneous voltage is proportional to the phase difference, and whose frequency is equal to the difference in frequency, between said signals from said reference generator and said frequency standard; a second comparison means whose input circuits are connected to the outputs of said reference generator and said frequency standard, said second comparison means having phase shifting means connected in one of its input circuits to introduce a 120 degree phase shift in one direction between the output signals from said frequency standard and said reference generator, said second comparison means providing a second control signal whose instantaneous voltage is proportional to the phase difference, and whose frequency is equal to the difference, between the phase-shifted input signal and the other input signal; a third comparison means whose input circuits are connected to the outputs of said reference generator and said frequency standard, said third comparison means having phase shifting means connected in one of its input circuits to introduce a 120 degree phase shift, in a direction opposite to that of said second comparison means, between the output signals from said frequency standard and said reference generator, said third comparison means providing a third control signal whose instantaneous voltage is proportional to the phase difference, and whose frequency is equal to the difference in frequency, between the phase-shifted input signal and the other input signal; a first amplifier means connected to said first comparison means and amplifying said first control signal; a second amplifier means connected to said second comparison means and amplifying said second control signal; a third amplifier means connected to said third comparison means and amplifying said third control signal; means connecting the output of said first amplifier means to one of said phase windings of said alternator to control the energization thereof; means connecting the output of said second amplifier to a second of said phase windings of said alternator to control the energization thereof; and means connecting the output of said third amplifier means to a third phase winding of said alternator to control the energization thereof, whereby the magnetic field produced by said field windings is caused to rotate with respect to said armature to compensate for deviations in the speed of said prime mover, thereby accurately maintaining the output of said alternator at said desired frequency.

References Cited in the file of this patent

UNITED STATES PATENTS

| | | |
|---|---|---|
| 2,104,801 | Hansell | Jan. 11, 1938 |
| 2,522,139 | Schoenbaum | Sept. 12, 1950 |

UNITED STATES PATENT OFFICE
CERTIFICATE OF CORRECTION

Patent No. 2,886,766            May 12, 1959

Daniel K. Gibson

It is hereby certified that error appears in the printed specification of the above numbered patent requiring correction and that the said Letters Patent should read as corrected below.

Column 9, line 29, after "difference" insert -- in frequency --.

Signed and sealed this 1st day of September 1959.

(SEAL)
Attest:

KARL H. AXLINE
Attesting Officer

ROBERT C. WATSON
Commissioner of Patents